E. GUILLAUME.
PROCESS AND APPARATUS FOR THE RECTIFICATION OF CRUDE PETROLEUM AND OTHER VOLATILE LIQUIDS.
APPLICATION FILED JULY 9, 1908.
996,081. Patented June 27, 1911.
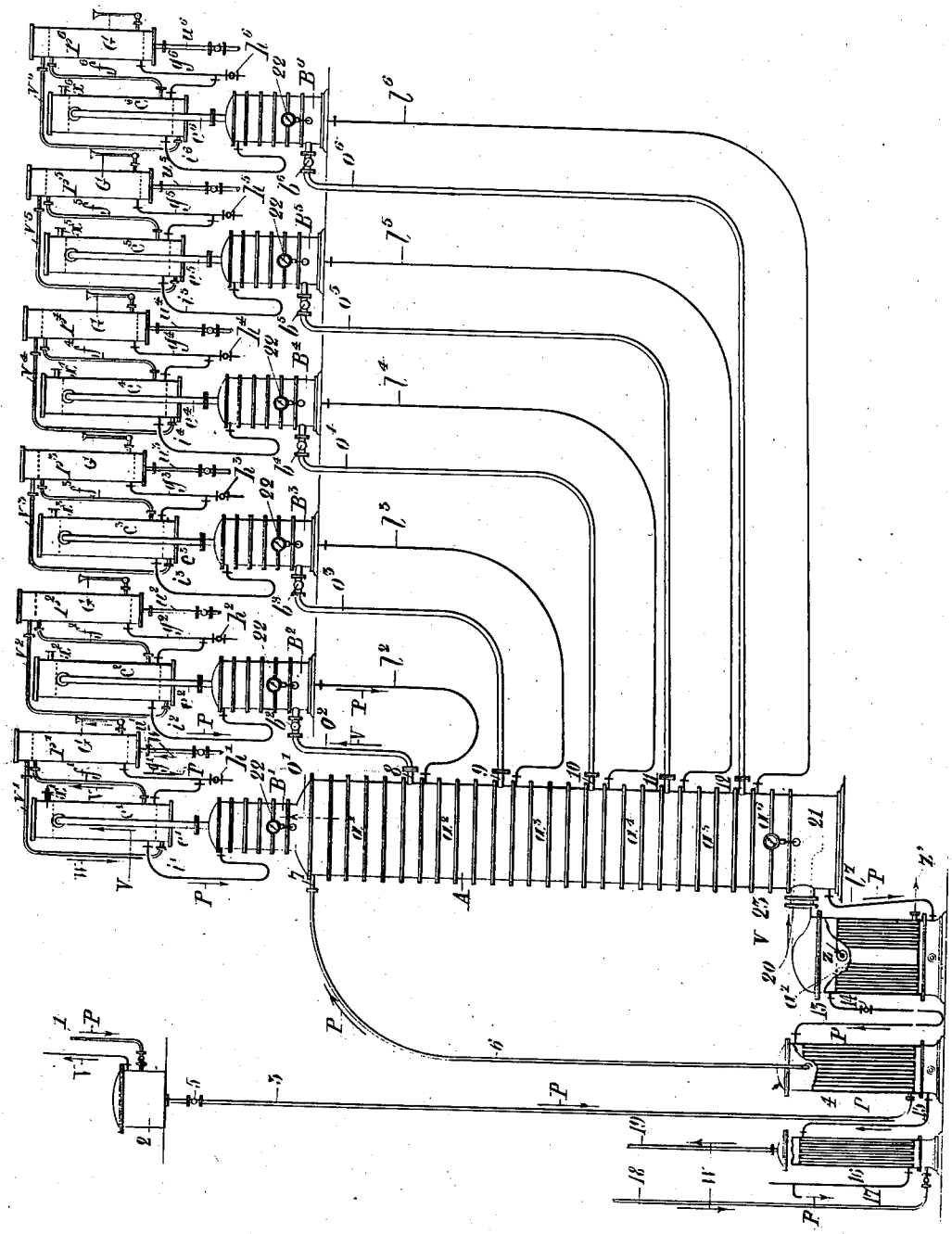

UNITED STATES PATENT OFFICE.

EMILE GUILLAUME, OF PARIS, FRANCE.

PROCESS AND APPARATUS FOR THE RECTIFICATION OF CRUDE PETROLEUM AND OTHER VOLATILE LIQUIDS.

996,081.    Specification of Letters Patent.    Patented June 27, 1911.

Application filed July 9, 1908. Serial No. 442,764.

*To all whom it may concern:*

Be it known that I, EMILE GUILLAUME, citizen of France, residing at Paris, in the said Republic, have invented new and useful Improvements in Processes and Apparatus for the Rectification of Crude Petroleum and other Volatile Liquids, (for which a French patent has been filed July 19, 1907,) of which the following is a specification.

The present invention relates to a process of and apparatus for the rectification of crude petroleum and like liquids composed of various components having maxima of volatilization at different temperatures, the object being to obtain the fractional distillation of the liquid into a number of separate portions, in each of which portions the substances contained will volatilize at as nearly as possible the same temperature.

The process of this invention has for its purpose the separation and simultaneous rectification of each of a plurality of volatile portions of the petroleum products and is adapted for the treatment of the crude volatile oils produced by previous distillation of crude petroleum as well as for the direct treatment of crude petroleum. The process is not particularly intended for the distillation and rectification of the less volatile petroleum products, such as paraffin and the like, but said process is applicable to the rectification of the crude more volatile oily products formed in the first phase of the ordinary distillation of crude petroleum, distillation of petroleum being usually stopped before the heavy oils pass into the distillate. The crude volatile oils thus obtained do not contain any substantial amount of paraffin oil (or other heavy residues) when they are finally submitted to rectification under the present process. The process may also be applied directly to crude petroleum. If crude petroleum itself is used instead of the crude volatile oils produced by a preliminary distillation of crude petroleum, by following the present mode of operation, not only can the said volatile oily products be separated from the petroleum, but besides, they may be respectively rectified, this rectification being separately although simultaneously effected, for each product of equal density. The undistilled portion of the petroleum recovered may also be perfectly purified of all the volatile oils which it contains, while still containing the heavier oily products, such as heavy burning oils and other heavier residues, which may be treated separately by ordinary means. If desired, the operation may be extended to extract and rectify still heavier volatile petroleum oils also, freeing the residuary product which issues at the base of the distilling column, for instance, from the heavier oils of petroleum intended for burning in lamps, the paraffin oils, and the other heavier but volatile residues, but, in view of the high temperature which is necessary, and certain other possible inconveniences which it is superfluous to enumerate, the inventor is at present of the opinion that it is preferable not to carry the distillation of crude petroleum to this point in the present operation.

For the present purpose there should be a distilling column, operated in a methodical and continuous manner and comprising as many superimposed stages as there are distinct products to be separated and rectified in the apparatus (with the exception of the residuary product issuing from the base of the column), and each of these stages should contain a sufficient number of plates to insure that the more volatile products in the liquid which passes downward through each stage should be completely distilled therefrom, so that such products shall not be found in the stage immediately below. The still should be provided with means at or near its top for introducing the material to be treated, which may be crude petroleum or crude volatile products formed by a preliminary distillation of petroleum. The still should also be provided with a plurality of vapor outlets along its sides, each such vapor outlet corresponding to a distinct stage in the distilling operation taking place in the column. There should also be a vapor outlet at the top. For each of these vapor outlets should be provided a distinct rectifying column, each such rectifying column containing a number of plates of the ordinary types and being adapted to secure a rectification of the vapor entering the column and coming from a discrete stage in the primary column still. The product from each rectifying column should be purified or rectified therein from the heavier products accompanying the vapors coming from the primary column. Proper connections should be made to allow the heavier products separated in each rectifying column to pass backward into the primary column still at the top of the stage immediately below the one from which the vapors passing to such rectifying column were drawn.

The process of the present case consists, briefly stated, in passing the material to be treated which may be, as stated, crude petroleum or a crude volatile product therefrom, down through a primary distilling column operating in a plurality of discrete stages, and in withdrawing vapor from the top of each such stages and submitting it to treatment in a rectifying column, the heavier products separated in each such rectifying column being returned to the primary still at a stage next below that from which the vapor came.

An apparatus designed for carrying this process into effect is illustrated more or less diagrammatically in the accompanying drawing, which shows, by way of example, a distilling apparatus adapted for the distillation or separation of crude petroleum or petroleum products into seven distinct lots or fractional portions. In this illustration, which is largely diagrammatic, for the sake of clearness, certain pipes or conduits carrying liquid petroleum products have been extra-marked with an arrow and P, certain other conduits carrying vapor have been extra-marked with a V and an arrow and certain other conduits carrying cooling water have been extra-marked with a W and an arrow.

The primary column still is lettered A and is divided into a number of superimposed stages marked respectively $a^1$, $a^2$, $a^3$, $a^4$, $a^5$ and $a^6$. The several rectifying columns are marked B, that for the top stage being superimposed on the top of the primary column A and marked $B^1$ while the others are marked $B^2$, $B^3$, $B^4$, $B^5$ and $B^6$ respectively. The several condensers are marked $c^1$, $c^2$, $c^3$, $c^4$, $c^5$ and $c^6$. The inlet pipe 1 furnishes petroleum to tank or cistern 2 whence it flows through pipe 3 controlled by valve 5 into preheater or heat interchanger 4, this preheater containing the usual tube-nest. The heated oil is delivered through 6 past 7 into the top of the still. The exhausted residual liquid from the base of the still passes through $l^7$ into the base of the heater $a^7$, furnished with steam through Z, $Z^1$ being provided for exit of condensed steam. The vapor produced in this heater passes through 20 and 21 into the base of the column still. Residual liquid from the heater goes through 13 past valve 14 into and through the preheater (4) passing thence through 15 into cooler 16 whence it emerges through 17. Cooling water is supplied to this cooler through 18 and emerges through 19. The vapors produced in the top stage $a^1$ of the primary still pass directly upward into $B^1$. The vapors produced in the next stage below ($a^2$) pass through 8 and $O^2$ into $B^2$, and those from the succeeding lower stages pass respectively through connections 9, 10, 11 and 12 and $O^3$, $O^4$, $O^5$ and $O^6$ into $B^3$, $B^4$, $B^5$ and $B^6$. The vapors from the rectifying columns $B^1$, etc., pass respectively through $e^1$, $e^2$, $e^3$, $e^4$, $e^5$ and $e^6$ into condensers $c^1$, $c^2$, $c^3$, $c^4$, $c^5$ and $c^6$, while a portion of the condensed heavier products flow back through $i^1$, $i^2$, $i^3$, $i^4$, $i^5$ and $i^6$ into the top of the respective rectifying columns. Each of the condensers ($c^1$, $c^2$, etc.) is provided with an adjacent cooler ($r^1$, $r^2$, etc) communication being respectively through $f^1$, $f^2$, etc. Each of these coolers is provided with a water inlet ($u^1$, $u^2$, etc.) and with a water outlet ($v^1$, $v^2$, etc.) and with a delivery outlet ($g^1$, $g^2$, etc.) provided with appropriate cocks ($h^1$, $h^2$, etc.). Each of the condensers $c^1$, $c^2$, etc., is provided with a water outlet $x^1$, $x^2$, etc. The rectifying columns are provided respectively with thermometers, all being marked 22.

In the use of this apparatus, suppose that the material to be treated is composed of several components, $A^1$, $A^2$, $A^3$ ... $A^7$, the component $A^1$ being the most volatile, and the boiling temperature of each of the components being, respectively, $t^1$, $t^2$, $t^3$ ... $t^7$. The material in question is introduced at the top of the distilling column through 6 and the entire component $A^1$, which is the most volatile, will be completely distilled on the plates of the section $a^1$ of the column, so that it will be completely eliminated from the liquid which passes downward below the vapor outlet 8. In a similar way the component or constituent $A^2$ will be completely distilled on the plates of the section $a^2$ so that it will be entirely eliminated from the liquid which passes downward below the vapor outlet 9, and so on, for all the other components, so that nothing enters the heater $a^7$ but the less volatile component $A^7$. The heat necessary to effect these successive distillations is furnished efficiently and entirely by vapors formed in the heater $a^7$, which is heated sufficiently for that purpose. The residuary product which issues from the base of the distilling column A through the tube $l^7$ enters the device $a^7$ below the casing which incloses the same and traverses the tubes of the tube nest within the casing and issues therefrom at the upper part through the tube 13. The residuary product is allowed to pass freely through the tube 13, cock 14 being always wide open in normal operation. This cock is only used at the end of an operation, its closing then preventing insufficiently exhausted products, which may pass to the base of the column A, passing through tube 13 into cooler 16 which should normally only receive exhausted residuary products. When in normal operation the residuary product passes through tube 13 into heat exchanger 4 and thence through tube 15 into cooler 16. Heating steam enters through the tube Z into the upper part of the casing and circulates therein, thereby heating the residuary product which traverses the tubes of the said casing from the bottom upward, and the condensed water exhausts through $Z^1$ at the lower part of the casing. Any desired temperature may be used.

It should be noted that the distillation of petroleum products requires much less heat than the distillation of other liquids, such as alcohol for example. It is well known that alcohol distilling and rectifying columns, operating continuously, are readily heated by means of a single heating member placed at their base, and it will be evident, *a fortiori* that the single heating device $a^7$ at the base of the distilling column A, will efficiently heat the column. Heating device $a^7$ furnishes all the vapor necessary to the vaporization of all the fractional portions to be separated in the column A, from the portion comprising the residuary product. The vapor issuing from the heater $a^7$ and entering the base of the column A through 20 operates, first of all, in the distillation of the oily product intended to constitute the sixth fractional portion, vapors being diverted through the tube $o^6$, from upper part of the stage or division $a^6$ of the column A. In the same way division $a^5$ is traversed by all the remaining vapor, that is to say, by all that is necessary for the distillation of the next fractional portion. The vapors constituting the fifth fractional portion are diverted through 11 and tube $o^5$ from the upper part of the division $a^5$ of the distilling column A, and so on for each of the successive fractional portions, the result of which is that the division $a^1$ is only traversed by the vapor necessary for the distillation of the vapors constituting the first or lowest boiling fractional portion.

It will be seen from the above description that the process is carried on with a small expenditure of heat.

The heating system is regulated in accordance with the indications furnished by the thermometer 23, placed at the base of the column A, which should indicate a predetermined normal temperature at the time the apparatus is set to work, corresponding to the nature of the products which are to be treated therein. If the temperature indicated by the thermometer 23 rises above this predetermined temperature, it shows that the vapors at the base of the column A contain too great a quantity of the less volatile products, and that, therefore, the operation of the heater $a^7$ is too active; it is, therefore, necessary to diminish the intensity of the heat in the latter. If on the contrary the indicated temperature falls below the predetermined temperature, the intensity of the heat must be increased.

The crude petroleum or crude petroleum distillate flowing into the system through the pipe 1, fills the cistern 2, and passes through the pipe 3, into the heat interchanger 4, the quantity passing being controlled by the cock 5. The material thence passes through the pipe 6 to the top of the distilling column A. The pipe 6 is not throttled and this allows vapors of volatile components which have been vaporized in the course of the heating of the material in its passage through the heat interchanger 4 to escape with the liquid into the distillation column A without passing any regulating valve. The portion $a^1$ of the column A comprised between the end 7 of the admission pipe 6 for the crude material and the end 8 of the outlet pipe $o^2$ for the vapors which form the second fractional portion, corresponds to the first stage of the distillation column through which the petroleum passes in descending. The vapors produced by the distillation in the first stage $a^1$, that is to say, those which are intended to form the first fractional portion, pass directly, as indicated by the arrow $o^1$, into the bottom of the first rectifying column $B^1$ allowing the less volatile essences which have been carried over with the said vapors to fall back directly into the distillation column A and to pass on downward with the other portions in that column. The vapors for forming the first portion, thus concentrated by the elimination of the less volatile products pass, through the pipe $e^1$, into the condenser $c^1$ and through the pipe $f^1$ into the adjacent cooler or refrigerator $r^1$. Condensed liquid is then removed through the outflow $g^1$ by means of a cock $h^1$ and may pass through a supplementary refrigerator, if desired, to the testing apparatus (not shown) which serves as a control in securing the correct density for this first portion. A connecting pipe $i^1$ permits the return to the top of the rectifying column $B^1$ of a part of the liquid condensed in the condenser $c^1$.

The supplemental refrigerators and testing apparatus for each portion may be of any desired type.

The most volatile bodies forming the first fractional portion of the product are completely vaporized and eliminated by methodical distillation before the material under treatment in flowing down through the still has reached the level of the vapor outlet 8.

The still section $a^2$ comprised between the vapor outlet 8 and the vapor outlet 9 forms the second stage of the distillation column and has been described with respect to the first stage, the bodies intended to form the second distillation portion and to be drawn through the outlet pipe $o^2$ are therein vaporized and completely eliminated before the material under treatment has reached the level of the vapor outlet 9 through which the vapor to form the third fractional portion passes. The same explanation applies to the parts $a^3$, $a^4$, $a^5$ and $a^6$ comprised, respectively, between the vapor outlets 9 and 10, 10 and 11, 11 and 12, and 12 and the bottom of the column A, in which parts the bodies forming the third, fourth, fifth and sixth fractional portions are vaporized and separated and respectively drawn out through the outlet pipes $o^3$, $o^4$, $o^5$ and $o^6$.

$B^2$, $B^3$, $B^4$, $B^5$ and $B^6$ are concentration or rectifying columns for the second, third, fourth, fifth and sixth fractional portions, respectively. The vapors forming these portions pass, respectively, through the pipes $e^2$, $e^3$, $e^4$, $e^5$ and $e^6$, the condensers $c^2$, $c^3$, $c^4$, $c^5$ and $c^6$, the pipes $f^2$, $f^3$, $f^4$, $f^5$ and $f^6$ and refrigerators $r^2$, $r^3$, $r^4$, $r^5$ and $r^6$, and flow out, respectively, through the pipes $g^2$, $g^3$, $g^4$, $g^5$, and $g^6$, and the cocks $h^2$, $h^3$, $h^4$, $h^5$, and $h^6$. Finally, the less volatile products which flow back from these respective columns pass again into the distillation column through the pipes, $l^2$, $l^3$, $l^4$, $l^5$ and $l^6$, and the connecting pipes $i^2$, $i^3$, $i^4$, $i^5$ and $i^6$, permit the return to the top of each rectifying column $B^2$, $B^3$, $B^4$, $B^5$ and $B^6$ of a part of the liquid condensed in the condensers $c^2$, $c^3$, $c^4$, $c^5$ and $c^6$. The part $a^6$ below the vapor outlet 12 forms the lowest stage of the distilling column A, and it is in this part that the sixth fractional portion is vaporized, said vaporized fraction passing out at 12 through the outlet pipe $o^6$. The seventh or residual fractional portion consists of the hot petroleum residues which pass out by the pipe 13 from the boiler $a^7$ and past the cock 14, which is wide open, into the tubular part of the heat interchanger 4, after which these products pass through the pipe 15 to the cooler 16 and finally flow out, suitably cooled, through pipe 17. The cooling water circulates through the pipe 18, the tubular part of the refrigerator 16, and the pipe 19, in the direction indicated by the arrows W, W. The bodies forming the first six portions are severally vaporized in a methodical manner during the flow of the petroleum through each of the stages, while the heating of the distillation column is controlled in the required manner to insure the desired separation.

The boiler $a^7$ produces all the vapor necessary for the vaporization of all the fractional portions, except, of course, the seventh, and all this vapor passes through 20, and 21 into the base of the still or last stage, stage $a^6$ and over the plates of the same, serving thus to distil the vapors forming the sixth portion (the vapor forming the sixth portion passing off by the pipe $o^6$) the fifth stage $a^5$ is traversed in turn by all the remaining vapor, that is to say, by all that is necessary for the vaporization of the first five fractional portions; in the same manner the vapor forming the fifth lot having been drawn off by the pipe $o^5$ at the level of the fifth stage, the plates at the fourth stage $a^4$ are traversed only by the vapors necessary for vaporization of the first four fractional portions; and for the remaining stages the procedure is the same until the first stage $a^1$ is reached through which only as much of the heating vapor flows as is necessary for the distillation of the first portion.

The above explanation shows that, in the new process, the heat necessary for the complete and successive distillation in a simultaneous and continuous manner of the six fractional portions is considerably augmented without the necessity of correspondingly increasing the total heating. Similarly the heat necessary for the distillation of the first five portions all comes into play in effecting the distillation of the fifth portion, and so forth for each of the higher stages, decreasing by a certain amount in each stage until the first is reached, which only receives the amount of heat necessary for the distillation of the first portion.

In general, the maintenance of a uniform density at the outflow of each of the concentration columns $B^1$ . . . $B^6$, may be attained by the same means as are known and employed for the maintenance of the constant percentage of alcohol from the production of concentrated alcohols by the distillation of wine. Thermometers, 22, arranged at the base of each of the concentration columns make it possible to control the temperature of the vaporized essences entering these columns and consequently to control the cocks $b^2$, $b^3$, $b^4$, $b^5$, $b^6$, which regulate the access of the said vapors into the concentration columns $B^2$, $B^3$, $B^4$, $B^5$ and $B^6$. It will thus be seen that by the combined use of the cocks $h^1$ and $b^2$ controlling, respectively, the outflow of the bodies forming the first portion, and the entry of the bodies forming the second portion, into the concentration column $B^2$, and then respectively of the cocks $h^2$ and $b^3$, $h^3$ and $b^4$, $h^4$ and $b^5$, $h^5$ and $b^6$, and, finally, of the cock $h^6$ and the degree of heating in the boiler $a^7$ it is possible to maintain constant the temperatures of the vapors entering at the base of each concentration column respectively, and thus to insure the permanence of the composition of the vapors.

The following description will illustrate how the operation of the process in question can be practically carried out. Throughout the description temperatures are referred to in thermometric degrees of the centigrade system. Suppose, for the sake of example, that it is a question of separating into six distinct fractions the several components contained in a crude petroleum and divided as follows: Product $A^1$ comprising 1.5% by volume of the raw material will be an oil weighing 630 grams per liter and boiling at 45°. Product $A^2$ comprising 2% by volume of the raw material will be an oil weighing 650 grams per liter and boiling at 65° Product $A^3$ comprising 2.5% by volume of the raw material will be an oil weighing 680 grams per liter and boiling at 85°. Product $A^4$ comprising 3% by volume of the raw material will be an oil weighing 695 grams per liter and boiling at 95°. Product $A^5$ comprising 4% by volume of the raw material will be an oil weighing 720 grams per liter and boiling at 120°. Product $A^6$ comprising 2% by volume of the raw material will be an oil weighing 760 grams per liter and boiling at 140°. The crude material, the feed of which is regulated by the cock 5 placed between the tank 2 and the heat exchanger 4, traverses this latter, then passes through the tube 6 to the upper plate of the distilling column A. Simultaneously steam under pressure, being, if necessary, superheated to the necessary temperature, is brought through Z into the heating device $a^7$, the condensation issuing through $Z^1$. The column A being thus put into operation and the cocks $h^1 \ldots h^6$ being closed, and also the cocks $b^2 \ldots b^6$, one commences by regulating the outlet cock $h^1$ of column $B^1$, by opening the said cock progressively until the density of the liquid flowing at the corresponding gage, which should always be composed of the product $A^1$, slightly exceeds the value 630. As soon as this value is passed, which proves that a little of the product $A^2$ has reached the gage appropriated to product $A^1$, the opening of the cock $h^1$ is reduced to a degree strictly necessary to keep the density at 630. This having been done, one opens wide the cock $b^2$ which causes the withdrawal of the rectified product corresponding to and feeding the rectifying column $B^2$, keeping closed the outlet cock $h^2$ during the time necessary for the proper rectification; then the cock $h^2$ is opened very little at first, to cause the least possible flow at the corresponding gage, so as to make sure that the density of the issuing product is no longer 630; indeed, if this density was still 630, this would prove that the heating of the distilling column A is not sufficient to distil the product $A^1$ completely on the series of plates which constitute the stage $a^1$, comprised between the inlet 7 of the crude material and the vapor outlet 8 of the withdrawal portion which feeds the column $B^2$. In this case, one would greatly increase the heat in the boiler $a^7$, and would again regulate the cock $h^1$ until the density in the outlet gage of the essence $A^2$ was no longer 630. One then operates the regulation of cock $h^2$ proceeding in the same manner as with cock $h^1$ so as to obtain the maximum flow, of product $A^2$ of density 650, at the corresponding outlet gage. When the operation of column $B^2$ has been started, column $B^3$ is set in operation exactly as was done with column $B^2$, and, if necessary, the heat of the distilling column A is increased so that the product $A^2$ may be completely distilled on the series of plates of the stage $a^2$ comprised between the vapor outlets 8 and 9.

To avoid a useless expenditure of heat, the cock $b^2$ is regulated so as to limit to what is actually necessary the feed to column $B^2$. For this purpose, the opening of the cock $b^2$ is diminished progressively and by very small degrees so long as the density at the outlet gage of product $A^2$ does not vary. In the same way is effected the setting into successive operation of the rectifying columns $B^4$, $B^5$ and $B^6$, and the respective adjustments of the cocks $b^3$, $b^4$, $b^5$ and $b^6$. For the adjustment of cock $b^6$ one first makes sure that product $A^6$, density 760, has been completely eliminated from the residuary petroleum at its issue from the apparatus, it being understood that if the elimination of any one of the products in the stage appropriated to its distillation is insufficient, the heat is increased until this elimination is complete. The petroleum issuing at the base of the apparatus will thus be perfectly purified of the volatile products which it contains and which it is desired to produce, but it still will contain the whole of the products less volatile than the latter. Strictly speaking, the process could be extended up to the extraction and rectification of kerosene and the like heavy burning oils, so as to leave in the residuary product issuing at the base of the distilling column A only the heaviest residue. But considering the very high degree of temperature, and to avoid the possibility of the formation of solid products, it is preferable not to push the distillation of the crude petroleum too far in the apparatus. To sum up, by operating thus and in the case of the example chosen, there will be obtained from the raw material exactly 1.5% by volume of a product weighing 630 grams per liter, (product $A^1$), 2% by volume of a product weighing 650 grams per liter, (product $A^2$), etc.

When the apparatus has been put into operation as just described, it is advisable to read the temperatures indicated by the thermometers 22, placed at the lower part of each of the columns $B^1$, $B^2 \ldots B^6$ and 23 placed at the base of the stage $a^6$; indeed, these temperatures being found to be those corresponding to the proper general operation, it follows that these thermometers serve as an easily visible control for the operator. In the example chosen, these temperatures will be respectively comprised between 45–65, 65–85, 85–95, 95–120, 120–140 degrees for the thermometers placed at the lower part of the columns $B^1$, $B^2$ ... $B^6$ and between 140–160 degrees for the thermometer placed at the lower stage $a^6$ of the distilling column.

It will be advantageous to control the heating of the boiler $a^7$ by means of a regulator, several forms of such regulators being of course known for use with water. But it will be necessary to replace the water generally employed to actuate the floats of said regulators, by the residual petroleum coming for example from the distillation column A, that is to say, by petroleum having a high temperature of vaporization in order to avoid the production of any ebullition in the said regulator, and to prevent the entry of water into the distillation column. The same would be the case if automatic regulators were being used to control the entry of water of refrigeration circulating through the pipes $u^1$, $v^1$, $x^1$ ... $u^6$, $v^6$, $x^6$, such regulators being already well known in their action with water.

Finally, the arrows marked on the drawing indicate the direction of circulation; that is to say, the arrows P show the direction of flow of the petroleum or liquid bodies, the arrow G shows the flow of the non-condensable gases, escaping through the pipes $p^1$ ... $p^6$, from the refrigerators $r^1$ ... $r^6$, the arrow V shows the direction of flow of the vaporized petroleum products, the arrows W show the direction of the flow of the water, and finally the arrows Z and Z' show the entrance of the heating steam for the boiler $a^7$, and the outlet for the corresponding condensed water.

Having now particularly described and ascertained the nature of my said invention and in what manner the same is to be performed, I declare that what I claim is:—

1. An improved process for the separation and rectification of petroleum and all liquids composed of diverse products capable of volatilization at different temperatures, which consists in introducing the liquid at the top of a main continuous distilling column, having as many stages as there are products to be separated, withdrawing from the top of each of these stages the vaporized products which traverse it and feeding each of them into the lower part of a rectifying column, extracting the rectified product from the top of the upper part of the main rectifying column and returning the less volatile products, which sink in the said column and issue at its lower part to the top of the corresponding stage of the distilling column, and withdrawing the residuary products of the operation from the base of the said main distilling column, substantially as described.

2. An apparatus for distilling petroleum and the like comprising a continuous distilling column, means for feeding the products to be treated to its upper part, means for withdrawing from its lower part the residuary product of the operation, and means for withdrawing from the said distilling column at intermediate points the distinct products to be separated and rectified in the apparatus, the said column having at these intermediate points a number of plates sufficient to assure the complete distillation of the more volatile products contained in the liquid which traverses the said plates, and a plurality of supplemental rectifying columns having their lower ends connected to said main column at said intermediate points.

3. An apparatus for distilling petroleum and the like, comprising a distilling column consisting of a plurality of superimposed distilling portions, a plurality of rectifying columns operatively associated with said distilling portions, a conduit extending between each distilling portion and its associated rectifying column for conducting the products of distillation from the former to the latter, and a second conduit extending between each distilling portion and its associated rectifying column for conducting any condensed vapor from the latter to the former.

In testimony whereof I have signed my name to this specification in the presence of two subscribing witnesses.

EMILE GUILLAUME.

Witnesses:
 JULES FAYOLLET,
 EUGÈNE TICHON.